June 30, 1936.  M. J. BERLYN  2,046,283
MOTOR DRIVEN POWER UNIT FOR OPERATING VALVES AND THE LIKE
Filed Sept. 5, 1935  3 Sheets-Sheet 1

INVENTOR
M. J. BERLYN
BY J. D. O'Connell
ATTORNEY

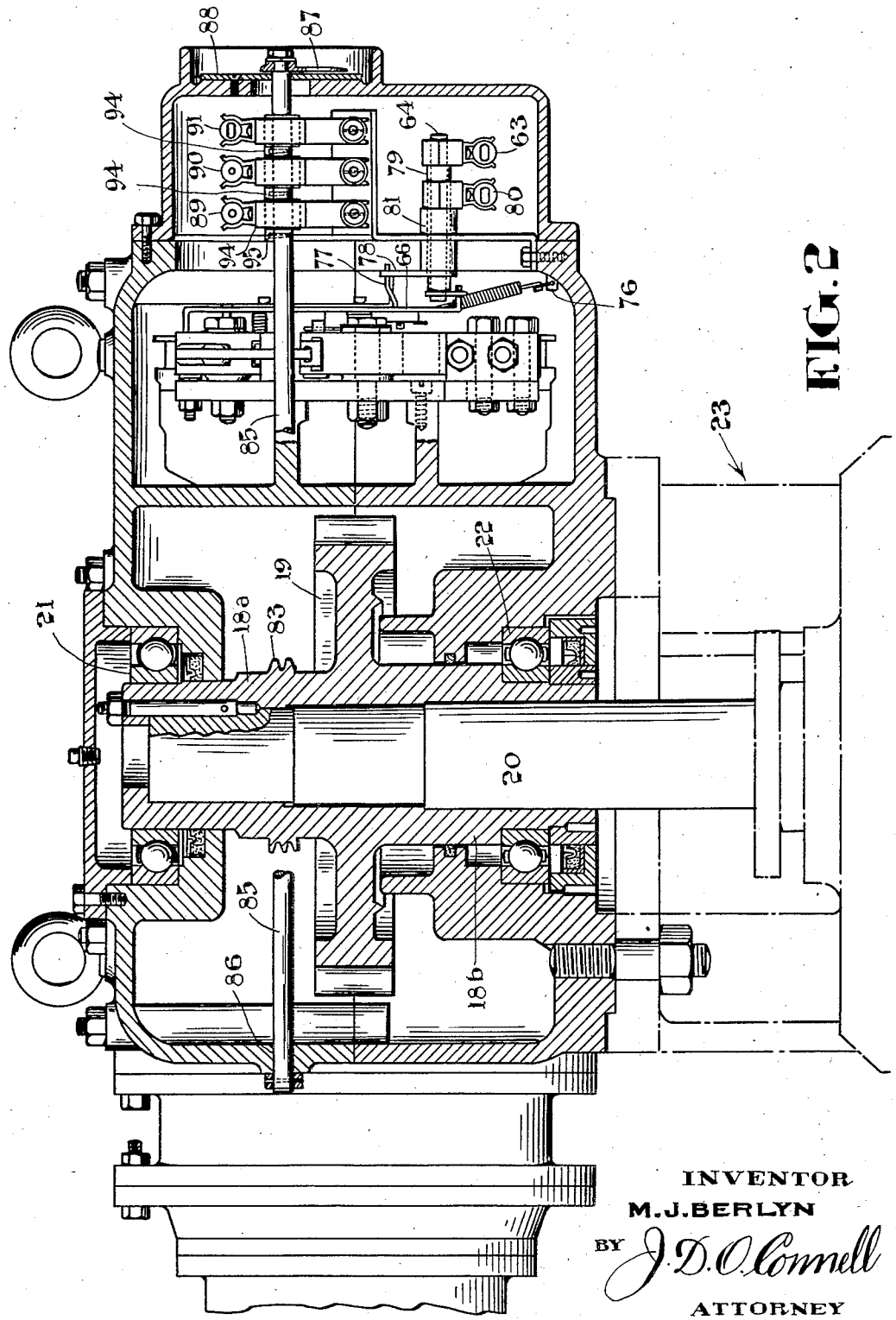

June 30, 1936. M. J. BERLYN 2,046,283
MOTOR DRIVEN POWER UNIT FOR OPERATING VALVES AND THE LIKE
Filed Sept. 5, 1935 3 Sheets-Sheet 3
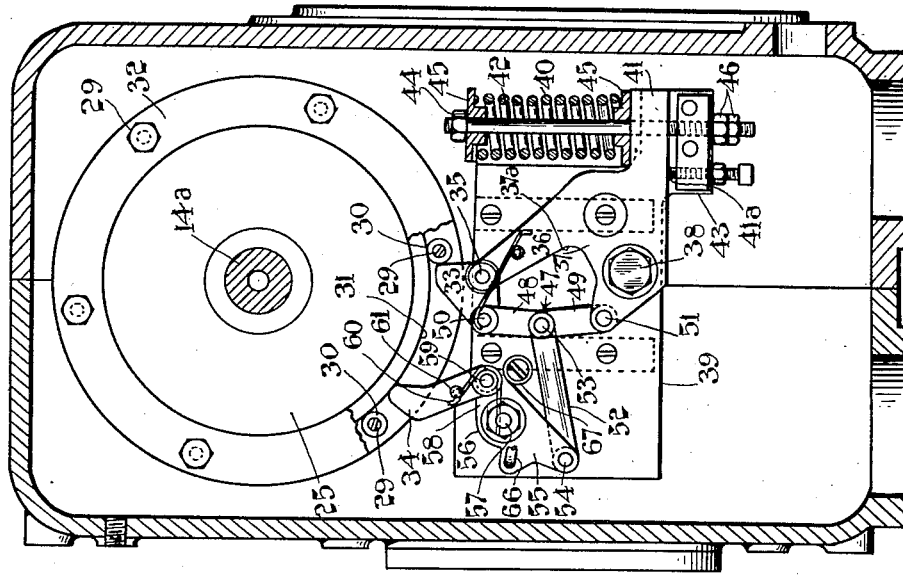
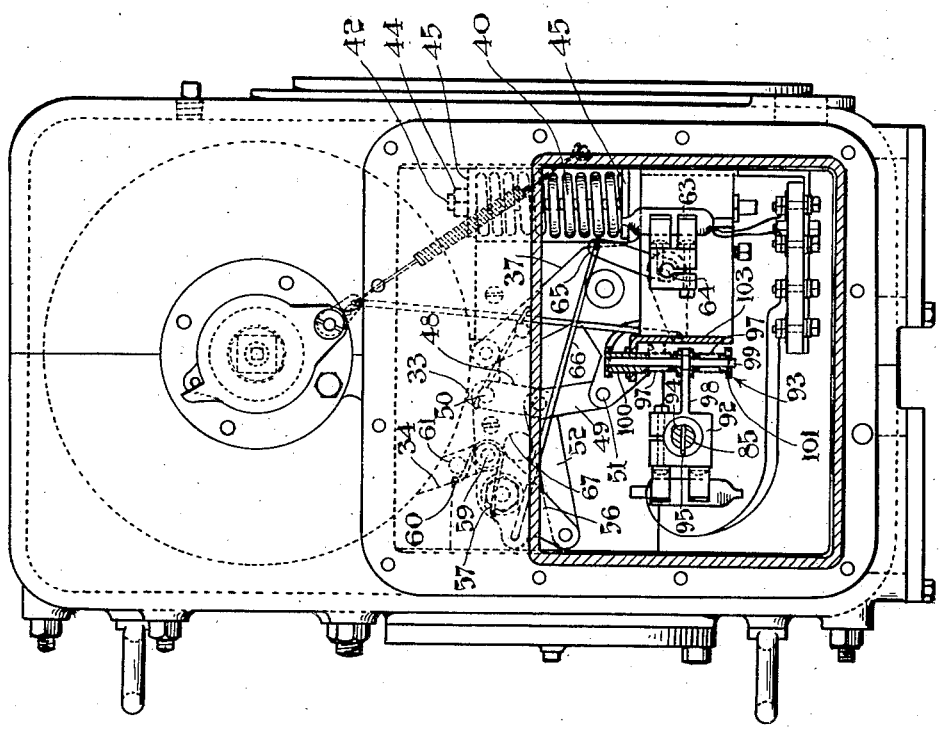
INVENTOR
M. J. BERLYN
BY J. D. O'Connell
ATTORNEY Patented June 30, 1936

2,046,283

UNITED STATES PATENT OFFICE 2,046,283

MOTOR DRIVEN POWER UNIT FOR OPERATING VALVES AND THE LIKE

Martin J. Berlyn, Montreal, Quebec, Canada, assignor to Dominion Engineering Works Limited, Lachine, Quebec, Canada Application September 5, 1935, Serial No. 39,336

8 Claims. (Cl. 192—150)

This invention relates to improvements in motor driven power units for operating valves and other devices. More particularly, the invention consists in the provision of improved means whereby a drive connection, through which power is transmitted from a motor to a valve or other driven element, is automatically rendered ineffective when the valve or other driven element reaches the limit of its intended movement in one direction or encounters an arresting obstruction which causes the torque on the motor shaft to rise above a predetermined value.

Another feature consists in the provision of novel means for automatically interrupting transmission of power from the motor to the valve or other driven element and simultaneously opening the motor circuit.

A still further feature consists in the provision of an improved form of drive connection which is rendered effective or ineffective by the restraint and release of a rotatable part controlled by a pair of restraining elements, one of which serves to restrain said part against rotation in one direction until the torque on said part exceeds a predetermined value whereupon said restraining element is caused to assume an inoperative position, the remaining restraining element serving to resist rotation of said part in the opposite direction and being also utilized as part of a mechanism for resetting the first mentioned restraining element after it has been displaced to an inoperative position.

Proceeding now to a more detailed description of this invention reference will be had to the accompanying drawings, wherein—

Fig. 2 is a vertical sectional view taken substantially along the line 2—2 of Fig. 1.

Fig. 3 is a sectional view along the line 3—3 of Fig. 1.

Fig. 4 is a sectional view taken substantially along the line 4—4 of Fig. 1.

Figure 1:
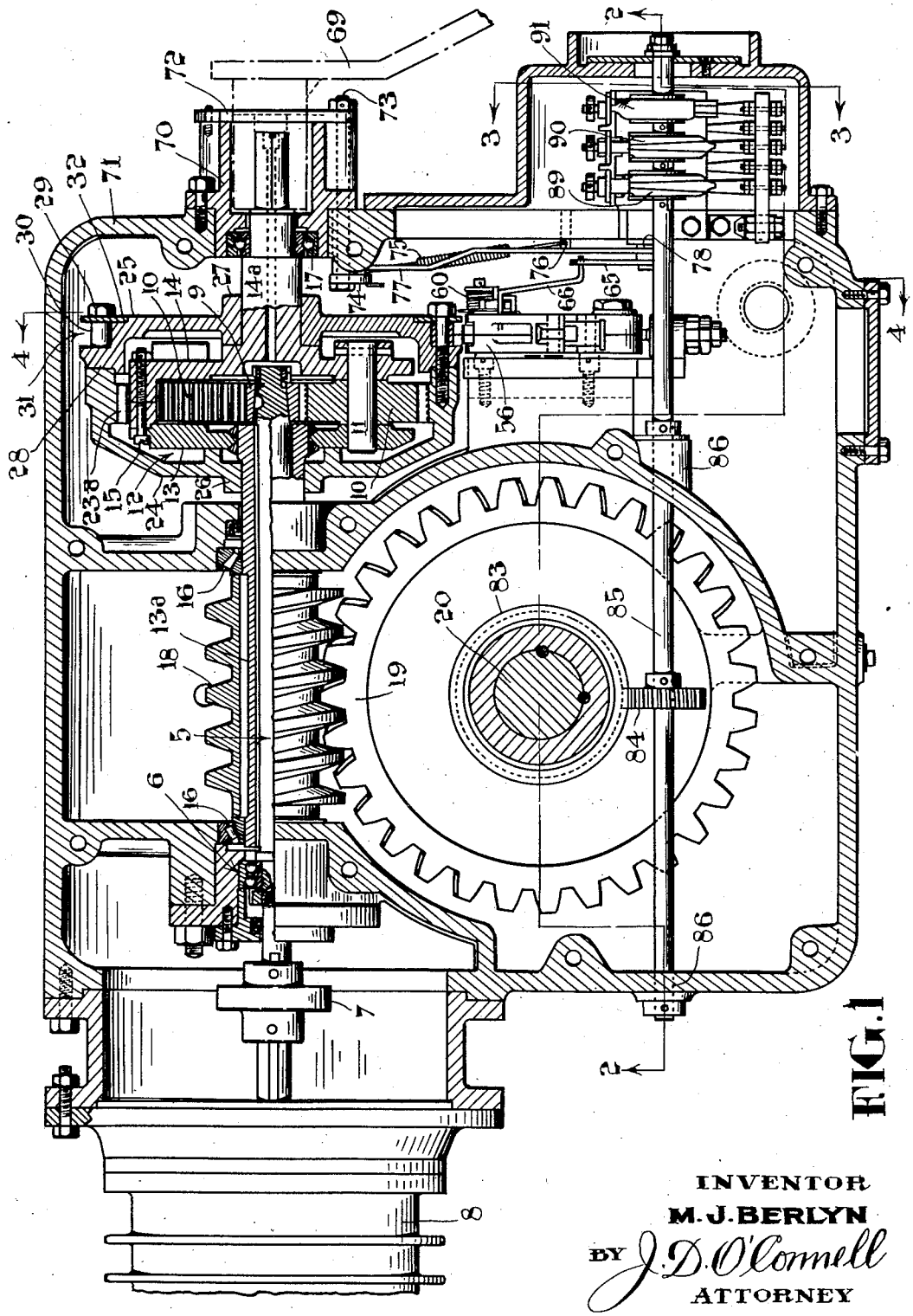
Fig. 1 is a horizontal sectional view of a power driven unit designed in accordance with this invention.

Referring more particularly to the drawings, 5 designates a drive shaft mounted in self-aligning bearing 6 and having one end connected, by flexible coupling 7, to the armature shaft of an electric motor 8. The other end of shaft 5 carries a fixed pinion 9 meshing with three gears 10 rotatably mounted in spindles 11 carried by a rotatable spider 12.

The spider 12 comprises sections 13 and 14 fastened together by bolts 15. Section 13 is provided with a tubular extension 13a surrounding shaft 5 and mounted in suitable combined radial and thrust bearings 16. Section 14 is provided with a shaft extension 14a mounted in a suitable bearing 17.

A worm 18 is keyed to the spider extension 13a in mesh with a worm wheel 19 keyed to shaft 20. Wheel 19 is provided with tubular hub extensions 18a and 18b, the former being carried in a radial bearing 21 and the latter in a combined radial and two-way thrust bearing 22.

In the present instance shaft 20 represents the non-rising operating spindle of a gate valve generally indicated at 23. In the case of a rising stem valve shaft 20 may be threaded through the wheel 19 to permit the latter to be operated as a nut for raising and lowering the valve. Other methods of utilizing shaft 20 for operating valves and other devices may also be resorted to in accordance with this invention.

The three gears 10, in addition to meshing with pinion 9, also mesh with a ring gear 23a formed as an integral part of a rotatably mounted casing 24 equipped with a removable cover 25. This casing and its cover are provided with bosses 26 and 27 which form bearings on the spider extensions 13a and 14a. Cover 25 is spigoted onto casing 24, as indicated at 28, and is fastened in place by cap screws 29. These screws pass through bushings 30 located within an annular groove 31. In the present instance the outer portion of the cover is shown reduced in diameter to form the bottom and one side wall of said groove, the remaining side wall being formed by a ring plate 32 through which the screws 29 are passed, said plate being fastened to and projecting beyond the reduced portion of the cover.

When shaft 20 is being driven through the differential gearing described herein the torque reaction tending to rotate casing 24 is resisted by the abutment of one of the bushings 30 on pawl 33 or pawl 34 according to the sense of the applied motor torque. Assuming shaft 20 to represent a valve spindle or operating shaft therefor the torque reaction on casing 24 is resisted by pawl 33 during closing of the valve and by pawl 34 during opening of the valve.

Pawl 33 is rotatably mounted on a pin 35 carried by the arm 36 of a bell crank lever 37 which is pivotally mounted on a bolt 38 carried by a bracket 39. Counter clockwise rotation of lever 37 about its pivot 38 is normally prevented by the pressure of a spring 40 on the lever arm 41. As here shown spring 40 encircles a bolt 42 passing through the lever arm 41 and through an extension 43 of bracket 39. The upper end of the bolt is equipped with a nut 44 beneath which is a spring seat member 45 bearing on the upper end of the spring. A similar spring seat member 45 is interposed between the lower end of the spring and the lever arm 41. The lower portion of the bolt projects below the bracket extension 43 and is equipped with nuts 46 which resist upward movement of the bolt and may be adjusted thereon to regulate the compression of spring 40. As long as the torque reaction on casing 24 is below a predetermined maximum value the arm 41 of lever 37 is held against a stop 41a by the spring 40.

With the parts arranged as shown in Fig. 4 rotation of pawl 33 about its pivot 35 by the engaging bushing 30 is prevented by a collapsible strut generally indicated at 47. This strut comprises link members 48 and 49. The outer ends of these links are respectively pivoted to pawl 33 and lever 37 as indicated at 50 and 51, the inner ends of said links being fastened to each other and to one end of a further link 52 by a suitable pivot pin 53. The remaining end of link 52 is pivoted, as indicated at 54, to the arm 55 of a second bell crank lever 56 mounted on a pivot 57 carried by bracket 39. The remaining arm 58 of lever 56 carries the pawl 34 which is pivoted thereon as indicated at 59. A spring 60 is arranged to engage a pin 61 carried by pawl 34 and tends to hold the free end of the pawl against the bottom of the groove 31 containing the bushings 30.

Until the torque reaction on casing 24 exceeds a predetermined value lever 37 and the pawl 33 are held against counter clockwise rotation on their pivots 38 and 35 by means of the spring 40 and strut 47, the latter being held against collapse by the link connection 52. When, however, the valve reaches its closed position or encounters an arresting obstruction the torque reaction on casing 24 becomes sufficient to overcome the resistance of spring 40 with the result that the bushing 30 engaging pawl 33 causes said pawl, together with the links 48 and 49 and lever 37, to rotate as a unit about the lever pivot 38. The resulting movement of pawl 33 toward the pivot of lever 56 causes mutual pivoting of the links 48 and 49 about their connection pivot 53 until they are biased to collapse into the crotch 37a of lever 37, thus permitting pawl 33 to rotate in a counter clockwise direction about its pivot 35 until cleared by the engaging bushing 30. This frees casing 24 for rotation in a clockwise direction and disrupts the transmission of power from shaft 5 to worm 8 so that driven shaft 20 is, in effect, disconnected from drive shaft 5.

When links 48 and 49 collapse into the crotch of lever 37 they drag the link 52 to the right thus causing partial counter clockwise rotation of lever 56 about its pivot 57. This rotation of lever 56 is utilized to operate a switch 63 (Figs. 2 and 3) to open the motor circuit simultaneously with the disruption of power transmission to shaft 20. As here shown switch 63 is mounted on a spindle 64 equipped with a lever arm 65 attached to one end of an operating rod 66, the other end of said rod being attached to lever 56.

When the motor is operated to open the valve, the casing 24 is initially rotated in a counter clockwise direction until one of the bushings 30 abuts against the pawl 34 which is held against the bottom of groove 31 by spring 60. The force thus applied to pawl 34 causes the lever 56 to rotate in a clockwise direction about pivot 57 until its further movement is arrested, with shock, by a stop 67. When this happens casing 24 is held against further rotation in a counter clockwise direction and power is thus transmitted from shaft 5 to worm 8 to operate shaft 20 in a valve opening direction.

The clockwise rotation of lever 56 by casing 24 and pawl 34 serves to reset the links 48 and 49, pawl 33 and switch 63.

When it is necessary or desirable to resort to manual operation of shaft 20 this is accomplished by applying a hand crank 69 to the shaft extension 14a of spider 12. It will be noted that this shaft extension projects into a supplementary casing 70 attached to the main casing 71 in which practically all of the elements so far described are enclosed and supported. Access to shaft extension 14a is obtained through a door 72 normally closing the outer end of casing 71. This door is fixed to the outer portion of a pivot shaft 73 rotatably mounted in suitable openings formed in the casings 71 and 70. The inner end of shaft 73 is provided with a lever arm 74 attached to one end of a restoring spring 75 having its other end anchored as indicated at 76. One end of a connecting rod 77 is also pivotally attached to lever arm 74, the other end of said rod being pivoted to a lever arm 78 carried by a sleeve 79 on which is mounted an electrical switch 80. As shown in Fig. 2 sleeve 79 is rotatably mounted in a suitable bearing 81 and serves as a tubular bearing for the spindle 64 of switch 63.

When door 72 is opened to permit application of crank 69 to shaft extension 14a, the resulting movement of rod 77 and sleeve 79 operates switch 80 to break the motor circuit and thus prevent inadvertent operation of the motor when the hand crank is being used to actuate the valve. As soon as the hand crank is removed from shaft extension 14a the spring 75 acts to close the door 72 and to reset switch 80 so that the motor may then be operated.

The hub extension 18a of worm wheel 19 is formed with a worm 83 in mesh with a worm wheel 84 fixed to an indicator shaft 85 journalled in suitable bearings 86. One end of shaft 85 carries a pointer 87 which cooperates with a dial plate 88 to indicate the position of the valve or other device operated by shaft 20. The indicator shaft 85 also serves to operate three switches indicated at 89, 90 and 91. Each switch is carried by a separate holder 92 rotatably mounted on said shaft and is yieldingly held in a predetermined position by a suitable centering device generally indicated at 93. Each holder is provided with a lateral projection 94 adapted to be engaged by an operating pin 95 fixed to shaft 85. The original setting of the projections 94, pins 95 and centering devices 93 is such that when the valve operated by shaft 20 reaches its fully open position the switch 89 is positioned to break the motor circuit while switch 91 is positioned to effect closure of a suitable signal circuit (not shown) including a signal light or other means for indicating at a remote point that the valve is in open position. When the valve reaches its fully closed position the switch 90 is operated by shaft 85 to close a signal circuit for energizing a light or other signal device indicating that the valve is fully closed. Resetting of the switches 89, 90 and 91 is accomplished by the centering devices 93. As here shown each centering device includes a pair of springs 97 bearing against opposite sides of an arm 98 projecting from one of the holders 92. The springs of each pair are arranged on a bolt 99 between the arm 98 and suitable abutments 100 and 101. In the present instance abutment 101 is shown in the form of a bushing fitted on bolt 99 and firmly held in a suitable supporting bracket 103.

Having thus described my invention, what I claim is:—

1. In combination, a driving member, a driven member, a driving connection between said members including a rotatable part adapted to render such connection effective or ineffective according to whether said part is restrained or is free to rotate, a restraining element movable to an operative position for restraining said part or to an inoperative position releasing said part for rotation, a collapsible strut adapted to be set to hold the restraining element in its operative position or to be collapsed to permit movement of said element to its releasing position, and means, responsive to the pressure of said rotatable part on said restraining element, for effecting collapse of said strut when the torque on said rotatable part exceeds a predetermined value.

2. The combination set forth in claim 1 including means for automatically resetting said strut said means comprising a pivotally mounted lever, a link connection between the strut and one arm of said lever and a pawl having one end pivoted to said lever and the other end disposed to be engaged by said rotatable part for actuating said lever and link connection in a strut resetting direction.

3. The combination set forth in claim 1 including a motor for operating said driving member and means for opening the motor circuit simultaneously with the collapse of said strut.

4. In combination, a driving member, a driven member, a driving connection between said members including a rotatable part adapted to render said connection effective or ineffective according to whether said part is restrained or is free to rotate, a restraining element adapted to be releasably held in a position resisting rotation of said part during operation of the driving member in one direction, a second restraining element positioned to resist rotation of said part during operation of the driving member in the opposite direction, a collapsible strut adapted to be set to hold said first mentioned restraining element in its operative position or to be collapsed to permit movement of said restraining element to an inoperative or releasing position, and means responsive to the pressure of said rotatable part on said first mentioned restraining element for effecting collapse of said strut when the torque on said part exceeds a predetermined maximum value.

5. The combination set forth in claim 4 including means for automatically resetting said strut in response to rotation of said part into abutting engagement with the second mentioned restraining element.

6. In combination, a driving member, a driven member, a driving connection between said members including a rotatable part adapted to render such connection effective or ineffective according to whether such part is restrained or is free to rotate, and restraining means for said rotatable part comprising a pivotally mounted lever, a spring bearing against one arm of said lever, a restraining element pivoted to another arm of said lever, a collapsible strut connected between said lever and said restraining element and adapted to be set to hold the restraining element in a position to resist rotation of said rotatable part in one direction, a second pivotally mounted lever having one arm link connected to said strut, a second restraining element for said rotatable part pivoted to another arm of said second mentioned lever, the first mentioned lever together with the associated restraining element and collapsible strut being movable as a unit to a strut collapsing position when the pressure of said rotatable part on said associated restraining element exceeds a predetermined value, the strut being collapsed during such movement through the agency of its link connection with the second mentioned lever and being adapted to be reset through the agency of said link connection when the second mentioned lever and its associated restraining element are operated to a predetermined position by pressure applied thereto by said rotatable part.

7. In combination, a driving member, a driven member, a driving connection between said members including a rotatable part adapted to render such connection effective or ineffective according to whether such part is restrained or is free to rotate, said rotatable part including a series of spaced stop members and means for releasably restraining said rotatable part including a pivotally mounted lever, a restraining element pivoted to one arm of said lever, a collapsible strut connected between said restraining element and said lever and adapted to be set to hold said restraining element in an operative position where it serves as an abutment adapted to be engaged by one of said stops to prevent rotation of said rotatable part in one direction, a spring engageable with another arm of said lever and adapted to yield to permit unitary movement of said lever, restraining element and strut to a strut collapsing position when the pressure of said rotatable part on said restraining element exceeds a predetermined maximum value, and means for effecting automatic collapse and resetting of said strut including a second pivotally mounted lever, a link connection between one arm of said second lever and said strut, a stop engageable with the remaining arm of said second lever for limiting movement thereof in one direction, a pawl having one end pivoted to the remaining arm of said second lever and spring means for holding the other end of said pawl in the path of the stops carried by said rotatable part.

8. In combination, a motor, a driving member operated by said motor, a driven member, a drive connection between said members including a rotatable part adapted to render said connection effective or ineffective according to whether said part is restrained or is free to rotate, a plurality of spaced stops carried by said rotatable part, a pivotally mounted lever, a pawl pivoted to one arm of said lever, a collapsible strut connection between said pawl and said lever adapted to be set to hold the pawl in abutting engagement with one of said stops or to be collapsed to a position permitting said pawl to move out of abutting engagement with said stop, a spring serving to hold said lever in a definite position, said spring being yieldable to permit unitary movement of the lever, pawl and strut when the pressure applied to the pawl by the engaging stop of said rotatable part exceeds a predetermined maximum value, means acting automatically to effect collapse of said strut to a pawl releasing position in response to the aforesaid unitary movement of said lever, pawl and strut, said last mentioned means including provision for automatically opening the motor circuit simultaneously with the collapse of said strut.

MARTIN J. BERLYN.